United States Patent
Fender et al.

(10) Patent No.: US 11,126,611 B2
(45) Date of Patent: Sep. 21, 2021

(54) CODE DICTIONARY GENERATION BASED ON NON-BLOCKING OPERATIONS

(71) Applicant: Oracle International Corporation, Redwood Shores, CA (US)

(72) Inventors: Pit Fender, Union City, CA (US); Felix Schmidt, Redwood City, CA (US); Benjamin Schlegel, Merced, CA (US); Matthias Brantner, Sunnyvale, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 186 days.

(21) Appl. No.: 15/897,375

(22) Filed: Feb. 15, 2018

(65) Prior Publication Data

US 2019/0251194 A1    Aug. 15, 2019

(51) Int. Cl.
*G06F 16/23* (2019.01)
*G06F 16/22* (2019.01)
*G06F 16/28* (2019.01)

(52) U.S. Cl.
CPC ........ *G06F 16/2365* (2019.01); *G06F 16/221* (2019.01); *G06F 16/285* (2019.01)

(58) Field of Classification Search
CPC .......................... G06F 16/2365; G06F 16/285
USPC .................................................. 707/769, 756
See application file for complete search history.

(56) References Cited

U.S. PATENT DOCUMENTS

| | | | |
|---|---|---|---|
| 5,440,735 A * | 8/1995 | Goldring | G06F 16/284 |
| 6,954,758 B1 * | 10/2005 | O'Flaherty | G06Q 30/02 |
| | | | 707/802 |
| 7,647,291 B2 | 1/2010 | Mosescu | |
| 10,474,652 B2 | 11/2019 | Baskett | |
| 10,901,948 B2 * | 1/2021 | Ackerman | G06F 16/1744 |
| 2002/0174111 A1 * | 11/2002 | Kougiouris | G06F 16/2308 |
| 2004/0225673 A1 | 11/2004 | Beck | |
| 2006/0015510 A1 | 1/2006 | Trask | |
| 2007/0050367 A1 * | 3/2007 | Suganuma | G06F 16/2425 |

(Continued)

OTHER PUBLICATIONS

Westmann et al., "The Implementation and Performance of Compressed Databases", SIGMOD Rec., 29(3): pp. 55-67, 2000.

(Continued)

*Primary Examiner* — Giovanna B Colan
(74) *Attorney, Agent, or Firm* — Hickman Becker Bingham Ledesma LLP

(57) ABSTRACT

Techniques related to code dictionary generation based on non-blocking operations are disclosed. In some embodiments, a column of tokens includes a first token and a second token that are stored in separate rows. The column of tokens is correlated with a set of row identifiers including a first row identifier and a second row identifier that is different from the first row identifier. Correlating the column of tokens with the set of row identifiers involves: storing a correlation between the first token and the first row identifier, storing a correlation between the second token and the second row identifier if the first token and the second token have different values, and storing a correlation between the second token and the first row identifier if the first token and the second token have identical values. After correlating the column of tokens with the set of row identifiers, duplicate correlations are removed.

26 Claims, 10 Drawing Sheets

(56) References Cited

U.S. PATENT DOCUMENTS

| | | | |
|---|---|---|---|
| 2009/0254513 A1* | 10/2009 | Luukkala | G06F 16/1744 |
| 2010/0030748 A1* | 2/2010 | Netz | G06F 16/24557 |
| | | | 707/769 |
| 2010/0049730 A1* | 2/2010 | Qiao | G06F 16/24539 |
| | | | 707/756 |
| 2010/0262574 A1 | 10/2010 | Zhou | |
| 2010/0328115 A1 | 12/2010 | Binnig | |
| 2011/0161387 A1* | 6/2011 | Krueger | G06F 16/283 |
| | | | 707/825 |
| 2012/0124106 A1 | 5/2012 | Allen | |
| 2013/0060780 A1 | 3/2013 | Lahiri | |
| 2013/0103701 A1* | 4/2013 | Vishnubhatta | G06F 16/284 |
| | | | 707/754 |
| 2014/0317087 A1* | 10/2014 | Collins | G06F 16/2255 |
| | | | 707/715 |
| 2015/0074407 A1* | 3/2015 | Palmeri | H04L 63/0823 |
| | | | 713/171 |
| 2015/0178305 A1 | 6/2015 | Mueller | |
| 2015/0261882 A1* | 9/2015 | Roberts | G06F 16/258 |
| | | | 707/756 |
| 2015/0278268 A1 | 10/2015 | El-Ali | |
| 2016/0147804 A1 | 5/2016 | Wein | |
| 2016/0241577 A1* | 8/2016 | Johnson | G06F 16/278 |
| 2017/0031976 A1 | 2/2017 | Chavan | |
| 2017/0109406 A1 | 4/2017 | Chavan | |
| 2017/0242876 A1* | 8/2017 | Dubost | G06F 16/2365 |
| 2018/0150494 A1 | 5/2018 | Schulze | |
| 2018/0211143 A1* | 7/2018 | Haruta | G06K 15/1878 |
| 2018/0218020 A1* | 8/2018 | Dutta | G06F 16/22 |
| 2019/0102346 A1 | 4/2019 | Wang et al. | |
| 2019/0155925 A1 | 5/2019 | Giannikis et al. | |
| 2019/0155930 A1 | 5/2019 | Fender | |
| 2019/0205446 A1 | 7/2019 | Kandukuri et al. | |
| 2019/0251194 A1 | 8/2019 | Fender | |
| 2020/0394191 A1 | 12/2020 | Fender | |
| 2020/0394192 A1 | 12/2020 | Fender | |

OTHER PUBLICATIONS

Ristov, Strahil, LZ Trie and Dictionary Compression, Software: Practice and Experience, vol. 35, Issue 5, pp. 445-465, Apr. 25, 2005.

Ray et al., "Database Compression: A Performance Enhancement Tool", Proc. of 7th Intl. Conf. on Management of Data, COMAD, 1995, 20 pages.

Poess et al., "Data Compression in Oracle", VLDB 2003: Proceedings of the 29th International Conference on Very Large Data Bases, pp. 937-947.

Binnig et al., "Dictionary-based order-preserving string compression for main memory column stores", ACM SIGMOD 2009, 13 pages.

Antoshenkov et al., "Order Preserving Compression", ICDE 1996: Proceedings of the Twelfth International Conference on Data Engineering, pp. 655-663.

Abadi et al., "Integrating Compression and Execution in Column-Oriented Database Systems", SIGMOD 2006, pp. 671-682.

Palkar, et al., "Filter Before You Parse: Faster Analytics on Raw Data with Sparser", Proceedings of the VLDB Endowment, vol. 11, No. 11, dated 2018, 14 pages.

Mustard et al., "JumpGate: Towards In-Network Data Processing", dated 2019, 3 pages.

Balkesen et al., "RAPID: In-Memory Analytical Query Processing Engine with Extreme Performance perWatt", SIGMOD'18, Jun. 10-15, 2018, Houston, TX, USA, 13 pages.

Agrawal et al., "A Many-core Architecture for In-Memory Data Processing", MICRO-50, Oct. 14-18, 2017, Cambridge, MA, USA, 14 pages.

Wust et al., "Sparse Dictionaries for In-Memory Column Stores", DBKDA 2012, 9 pages.

Vagata et al., "Scaling the Facebook data warehouse to 300 PB", dated Apr. 10, 2014, 10 pages.

Sanders et al., "Optimize storage with deep compression in DB2 10", dated , May 17, 2012, 41 pages.

Patil et al., "Inverted Indexes for Phrases and Strings", SIGIR darted 2011, 10 pages.

Kornacker et al., "Impala: A Modern, Open-Source SQL Engine for Hadoop", 7thBiennial Conference on Innovative Data Systems Research (CIDR'15) dated Jan. 4-7, 2015, 10 pages.

Bentley, et al., "Fast Algorithms for Sorting and Searching Strings", SODA 1997, 10 pages.

Bender et al., "Anti-Persistence on Persistent Storage: History-Independent Sparse Tables and Dictionaries", PODS'16, Jun. 26-Jul. 1, 2016, San Francisco, CA, USA, 14 pages.

Antoshenkov et al., "Order Preserving Compression", ICDE, dated 1996, 9 pages.

Kandukuri, U.S. Appl. No. 15/861,212, filed Jan. 3, 2018, Office Action, dated Jan. 3, 2020.

Giannikis, U.S. Appl. No. 15/819,891, filed Nov. 21, 2017, Office Action, dated Mar. 19, 2020.

Fender, U.S. Appl. No. 15/819,193, filed Nov. 21, 2017, Office Action, dated Dec. 27, 2019.

TPC Benchmark H, (Decision Support) Standard Specification Revision 2.17.1, Copyright 1993—2014 Transaction Processing Performance Council, 136 pages.

M. Eich et al., "Faster Plan Generation through Consideration of Functional Dependencies and Keys", PVLDB, Volumne 9, dated 2016, 12 pages.

Boncz et al., "TPC-H Analyzed: Hidden Messages and Lessons Learned from an Inuential Benchmar", dated 2013, 16 pages.

Kandukuri, U.S. Appl. No. 15/861,212, filed Jan. 3, 2018, Notice of Allowance, dated May 27, 2020.

Giannikis, U.S. Appl. No. 15/819,891, filed 11/241/2017, Notice of Allowance, dated Jun. 18, 2020.

Fender, U.S. Appl. No. 16/155,740, filed Oct. 9, 2018, Office Action, dated Jul. 24, 2020.

\* cited by examiner

CODE DICTIONARY GENERATION BASED ON NON-BLOCKING OPERATIONS

TECHNICAL FIELD

Embodiments are generally related to information storage and retrieval technology. More specifically, embodiments are related to code dictionary generation based on non-blocking operations.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Database Overview

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a database management system (DBMS) by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11 g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Code Dictionaries

Typically, a column of database data is stored in a compressed format to conserve space in memory. Often used is a lightweight compression technique known as "dictionary encoding", which enables data that comprises a relatively large number of bits to be represented by a relatively small number of bits. The relatively large number of bits corresponds to a value of database data and is hereinafter referred to as a "token". The relatively small number of bits corresponds to an encoded representation of the token and is hereinafter referred to as a "code". Tokens and codes exhibit a one-to-one relationship with each other.

Referring to FIG. 1, column 100 comprises a set of database values in an uncompressed format, and column 102 comprises the set of database values in a compressed format. Tokens 106 comprise the uncompressed values of column 100, and codes 108 comprise the encoded representations of tokens 106. Advantageously, column 102 stores codes 108 instead of tokens 106, thereby achieving a significant savings in memory utilization. As such, column 102 can fit in relatively fast but small memory, such as dynamic random-access memory (DRAM), where queries can be executed against it relatively quickly.

Although FIG. 1 respectively depicts tokens 106 and codes 108 as strings and integers, it should be appreciated that the particular data types used may vary from implementation to implementation. However, to realize space savings, codes 108 preferably comprise fewer bits than tokens 106.

Among the costs of achieving the aforementioned space savings is the overhead of generating mappings that enable translation between tokens and codes. A token-to-code mapping enables compression of database data, such as when a database table is loaded into a database system; and a code-to-token mapping enables decompression of database data, such as when a query is evaluated over the database table. A token-to-code mapping is hereinafter referred to as an "encoding dictionary", and a code-to-token mapping is hereinafter referred to as a "decoding dictionary". Encoding dictionaries and decoding dictionaries are often maintained in relatively fast but small memory along with the compressed data with which they are associated. As used herein, a dictionary is said to be "for" or "associated with" database data if the dictionary is to be used for compressing and/or decompressing the database data.

Referring to FIG. 1, code dictionary 104 enables translation between tokens 106 and codes 108. As used herein, a "code dictionary" refers to an encoding dictionary and/or a decoding dictionary. Notably, a code dictionary can be both an encoding dictionary and a decoding dictionary. An example of such a code dictionary is a "relational dictionary", which is described in U.S. patent application Ser. No. 15/819,193, filed Nov. 21, 2017, the entirety of which is incorporated herein by reference. As suggested by its name, a relational dictionary can be implemented as a relational database table that is generated using a SQL statement. Advantageously, this enables a query compiler to determine the most efficient sequence of operations for generating the relational dictionary.

Some code dictionaries are "token-ordered". A token-ordered dictionary maintains tokens in a particular order, such as a lexicographical order. Typically, the order of the codes mirrors the order of the respective tokens. Code dictionary 104 is an example of a token-ordered dictionary. Tokens 106 are organized in a lexicographical order, and codes 108 are organized in an increasing order that mirrors the lexicographical order.

Advantageously, token-ordered dictionaries can be used to efficiently evaluate "range queries" over encoded database data. A range query specifies an upper boundary and/or a lower boundary for a set of one or more values. An example range query is "SELECT * FROM table WHERE token column>'Pat'". According to code dictionary 104, the query predicate is satisfied by any code that is greater than "2". Thus, the example range query can be efficiently evaluated based on scanning column 102 for any codes that are greater than "2".

Blocking Operations

As mentioned above, code dictionaries are typically generated based on performing a number of operations on a set of unencoded database values. For example, one or more of the operations depicted in FIG. 2 may be used, in any of a variety of orders, to generate a code dictionary. Referring to FIG. 2, set of ordered tokens 200 is generated based on performing a sorting operation on the tokens of column 100; set of distinct tokens 202 is generated based on performing a de-duplication operation on the tokens of set of ordered tokens 200; and code dictionary 104 is generated based on performing a ranking operation on the tokens of set of distinct tokens 202.

However, some of the operations used to generate code dictionaries are "blocking" operations. As suggested by its name, a blocking operation bottlenecks a data pipeline. Non-limiting examples of blocking operations include sorting functions and aggregate functions, such as min( ), max( ), rank( ), sum( ), count( ), and average( ). For reasons that are described below, a significant amount of time and computing resources may be consumed in performing a blocking operation. This causes any subsequent operations to wait, thereby contributing to the inefficiency of the overall dictionary generation process.

One reason why a significant amount of time and computing resources may be consumed is that a blocking operation typically goes through each value in a set of values before determining a correct result for the set. This is best illustrated with reference to aggregate functions, which can be used to perform de-duplication and ranking operations. For example, de-duplication can be performed using the aggregate function min( ). However, it is difficult to correctly determine a minimum value for a set without first knowing all the values in the set. Thus, the min( ) function goes through each value in the set before determining a minimum value. This can be particularly inefficient when there are a large number of values in the set.

Inefficient memory utilization is another reason why a significant amount of computing resources may be consumed. More specifically, going through each value in a set of values typically involves storing the set of values for processing. This is especially true when a sorting operation precedes the performance of an aggregate function. For example, in FIG. 2, generating set of distinct tokens 202 involves separately storing set of ordered tokens 200. However, doing so consumes a significant amount of memory, particularly when the set includes a large number of values.

For the purpose of providing a clear example, FIG. 2 depicts a small number of tokens, but the tokens in a column typically number in the hundreds of thousands or more. As such, parallelization is often involved in efficiently generating a code dictionary. For example, a plurality of parallel processes/distributed nodes may concurrently perform the sorting operation of FIG. 2 to generate set of ordered tokens 200.

However, parallelization involves synchronization between/among a plurality of processes or nodes. For example, ensuring a roughly even distribution of column values across a plurality of processes/nodes may involve gathering statistics about the column values, partitioning the column, and distributing the partitions. This is yet another reason why a significant amount of time and computing resources may be consumed in performing a blocking operation.

Thus, what is needed is a more efficient approach for generating a code dictionary.

Figure 1:
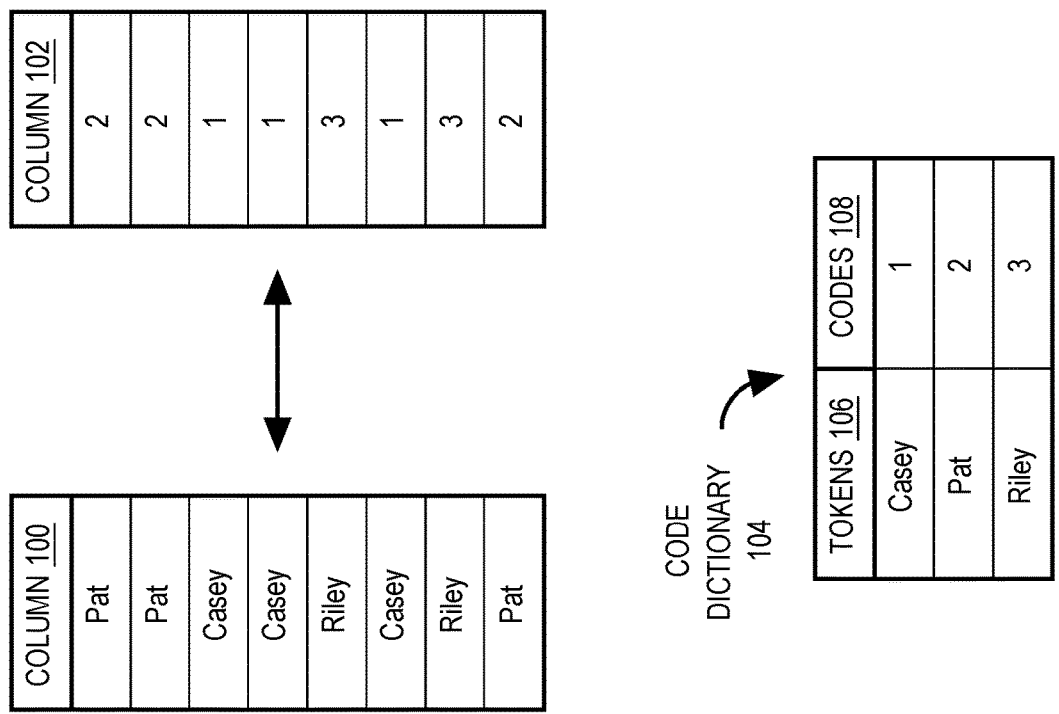
FIG. 1 depicts an example code dictionary.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Modifiers such as "first" and "second" are used to differentiate elements and do not necessarily indicate any particular order.

Introduction

A "non-blocking" operation can be used to generate a code dictionary using less processor time and less memory, thereby enabling database data to be compressed efficiently. In contrast to a blocking operation, it is unnecessary for a non-blocking operation to go through each value in a set of values to determine a result for the set. Additionally, it is unnecessary for a non-blocking operation to store the set of values for processing. Furthermore, synchronization between/among a plurality of processes/nodes can be deferred or avoided entirely.

Going through each value in a set can be avoided based on trading correctness for efficiency. More specifically, the result of an aggregate function may simply be assumed to be the first value, of a set of values, that is encountered. For example, the minimum value of the set {Pat, Casey, Riley} may be assumed to be the element "Pat". In some cases, the result will be incorrect, but in the context of generating a code dictionary, correct results may be unnecessary or may be determined at a later time. In other words, a non-blocking operation may be used to generate a code dictionary that can be used at least provisionally.

Storing a set of values can be avoided based on processing the set of values data in a streaming fashion. Since the result of an aggregate function can be assumed to be the first encountered value of a set of values, there is little, if any, reason to process the other values of the set. Instead, while scanning an input stream, an output stream comprising the first value of each set of values can be generated.

Synchronization can be deferred or entirely avoided based on deferring or entirely avoiding sorting operations. Thus, a non-blocking operation may be used to, at least provisionally, generate a code dictionary that is not token-ordered. However, if a token-ordered code dictionary is desired, a sorting operation can be performed after the non-blocking operation. This has the benefit of enabling the sorting operation to be performed on a reduced amount of data.

Described herein is a set of non-blocking operations for generating a code dictionary. These operations include ENCODE_FIRST( ), ENCODE_SPARSE_CODE, and ENCODE_FLAG_FIRST. To achieve further efficiency, two or more of these operations can be performed concurrently based on logically merging them into a single operation.

Non-Blocking Operations

As mentioned above, a non-blocking operation may be used to generate a code dictionary without first going through each value in a set of values, without separately storing the set of values for processing, and without incurring synchronization overhead. In some embodiments, this is achieved based on generating a code dictionary that has "sparse" codes and that is not token-ordered.

As used herein, a set of codes are referred to as sparse if the codes in the set, when represented in an increasing/decreasing order, are not consecutive over the domain of the codes. For example, the set of codes {1, 3, 5} is sparse over the domain of positive integers, because there are gaps where the even integers would have been. In contrast, "dense" codes are consecutive over the domain of the codes. For example, the set of codes {1, 2, 3} is dense over the domain of positive integers, because there are no gaps between adjacent codes.

ENCODE_FIRST( )

Figure 2:
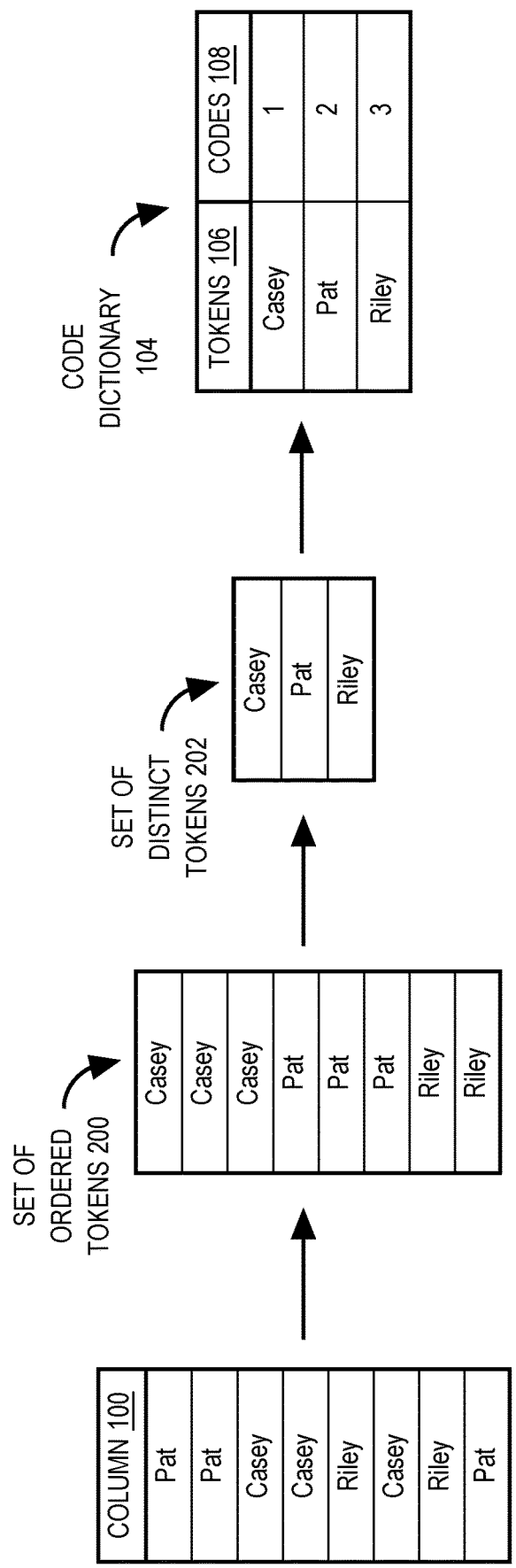
FIG. 2 depicts an example approach for generating a code dictionary that involves a blocking operation.
Figure 3A:
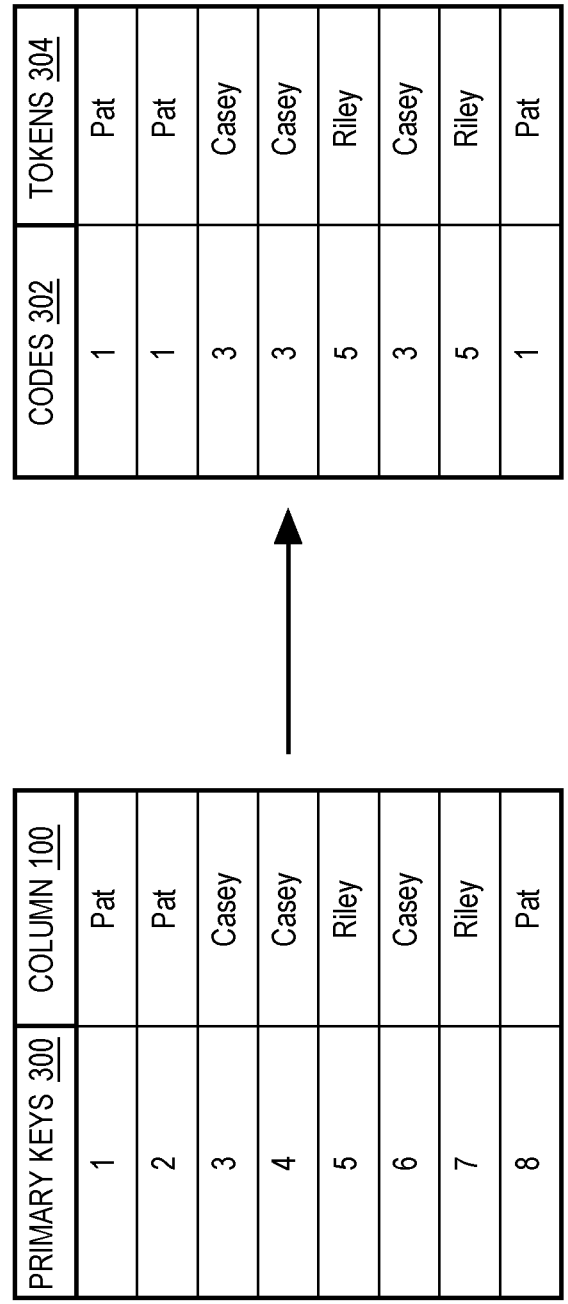
FIGS. 3A-B depict example non-blocking operations for correlating codes with tokens.

One way to generate a sparse and unordered code dictionary is to perform a non-blocking operation that assumes the result for a set of values is the nth value of the set, where n can be any number. For example, the non-blocking operation ENCODE_FIRST( ) assumes that the result is the first value in each set of one or more values. Example inputs and outputs involved in performing ENCODE_FIRST( ) are depicted in FIG. 3A. Notably, FIG. 3A does not include any of the intermediate results of FIG. 2.

Referring to FIG. 3A, column 100 stores a set of tokens 304, each token being stored in a separate row/as a separate element of column 100. The database table comprising column 100 also has a column, virtual or otherwise, of row identifiers. As used herein, a row identifier refers to any information that can be used to uniquely identify a row. In the example of FIG. 3A, the row identifiers are primary keys 300.

In general, the ENCODE_FIRST( ) operation uses some of the row identifiers as dictionary codes. More specifically, the code that represents a set of one or more identical values is the row identifier of the first value, of the set, that is encountered.

For example, FIG. 3A depicts a set comprising "Pat" tokens in Rows 1, 2, and 8. Since the "Pat" token in Row 1 is processed before any of the other "Pat" tokens, the primary key of the "Pat" token in Row 1 is used as the code that represents each of the "Pat" tokens. Accordingly, codes 302 comprise three instances of the code "1", each instance being correlated with a "Pat" token.

In some embodiments, correlating codes with tokens is achieved using a hash table. For example, a token may be hashed, and if a hash bucket does not already exist for the token, a hash bucket may be created. An identifier may be determined for the token, and the identifier may be stored in the hash bucket along with the token. Additionally, the token and the identifier may be provided as output. However, if a hash bucket already exists for the token, it is unnecessary to determine an identifier for the token. Instead, the token and the identifier already stored in the hash bucket may simply be provided as output.

In the example of FIG. 3A, since the "Pat" token in Row 1 is the first "Pat" token that is processed, a hash bucket storing "Pat" would be generated. The token "Pat" would be correlated with the primary key "1", which would also be stored in the hash bucket. Additionally, a correlation between "Pat" and "1" would be provided as output. The "Pat" token in Row 2 would also be hashed, but since the hash value indicates that the tokens in Rows 1 and 2 have identical values, the primary key stored in the "Pat" hash bucket would simply be provided as output. Hashing the "Casey" token in Row 3 would indicate a different value from the "Pat" token. Accordingly, a hash bucket storing "Casey" would be generated; "Casey" would be correlated with the primary key "3", which would be stored in the "Casey" hash bucket; and a correlation between "Casey" and "3" would be provided as output.

Advantageously, non-blocking operations enable processing data in a streaming fashion. However, this may result in output comprising duplicate correlations. For example, the output of FIG. 3A comprises three correlations between "Pat" and "1". Some of this output can be stored as encoded database data. As shall be described below, some of this output can also be stored as a code dictionary upon removing any duplicate correlations.

ENCODE_SPARSE_CODE

In some embodiments, row identifiers are represented using a relatively large number of bits. For example, a very large database table may comprise so many rows that each primary key is represented using twenty-two bytes. However, it may be inefficient to have such large dictionary codes. In such embodiments, the ENCODE_SPARSE_CODE operation can be used as an alternative to ENCODE_FIRST( ).

In general, ENCODE_SPARSE_CODE generates unique identifiers to use as dictionary codes. More specifically, each unique identifier comprises a portion identifying a particular process/node and another portion identifying a distinct token processed at the particular process/node. For example, the most significant bits may be reserved for a node identifier, and the least significant bits may be reserved for a local counter that is incremented for each distinct token processed at a particular node. Advantageously, such identifiers can be represented using a relatively small number of bits.

Figure 3B:
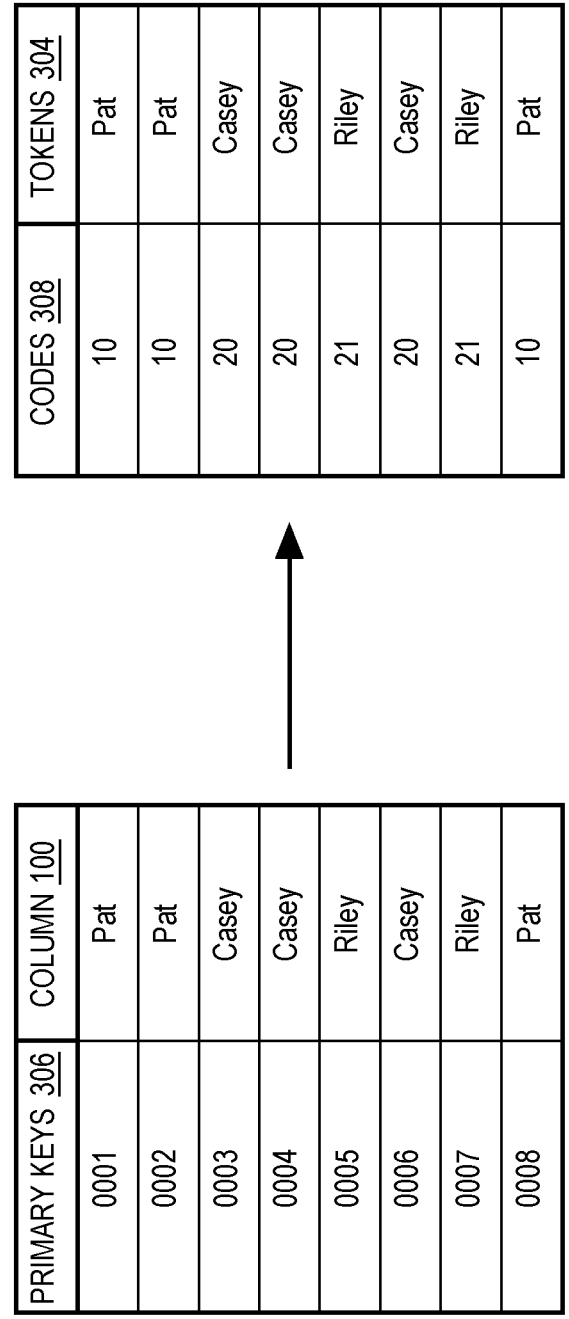

Example inputs and outputs involved in performing ENCODE_SPARSE_CODE are depicted in FIG. 3B. Like FIG. 3A, it does not include any of the intermediate results of FIG. 2. For the sake of clarity and ease of explanation, FIG. 3B depicts the reduction in the number of bits as a reduction in the number of digits. Thus, each of primary keys 306 is represented using four digits, whereas each of codes 308 is represented using two digits.

The first digit of each of codes 308 identifies a particular process/node. Notably, tokens having identical values are distributed to the same process/node. For example, the first digit of the code "10" indicates that each "Pat" token is processed at Node 1, whereas the first digit of the code "20" indicates that each "Casey" token is processed at Node 2.

The second digit of each of codes 308 identifies a distinct token that is distributed to the particular process/node identified by the first digit. Since tokens having identical values are distributed to the same process/node, such tokens have the same second digit in the example of FIG. 3B. For example, the first digits of the codes "20" and "21" respectively indicate that each "Casey" token and each "Riley" token is processed at Node 2; however, the second digits indicate that the "Casey" tokens are distinct from the "Riley" tokens. As mentioned above, the second digit can be thought of as a counter that is local to a process/node. At each process/node, a counter may have an initial value, such as zero, that is incremented whenever a distinct token is processed.

Notably, ENCODE_SPARSE_CODE involves partitioning a set of tokens across a plurality of processes/nodes. However, synchronization can be avoided based on randomly distributing the set of tokens across the plurality of processes/nodes. For example, hash partitioning may be used to achieve a random distribution. With hash partitioning, a token is hashed to determine where it is to be processed, thereby ensuring that tokens having identical values are distributed to the same process/node. However, without synchronization, a roughly even distribution is difficult to achieve.

Aside from the aforementioned differences, ENCODE_SPARSE_CODE can be implemented in a similar manner to ENCODE_FIRST( ). Thus, correlating codes 308 with tokens 304 may be achieved using a hash table and/or processing data in a streaming fashion.

ENCODE_FLAG_FIRST

As mentioned above, the output of ENCODE_FIRST( )/ENCODE_SPARSE_CODE can be stored as a code dictionary upon removing any duplicate correlations between tokens and codes. De-duplication may involve a non-blocking operation that flags the nth value of each set of one or more identical values. For example, the ENCODE_FLAG_FIRST operation flags the first value, from each set, that is processed. This enables de-duplication to be efficiently performed by filtering on the flags.

Figure 4:
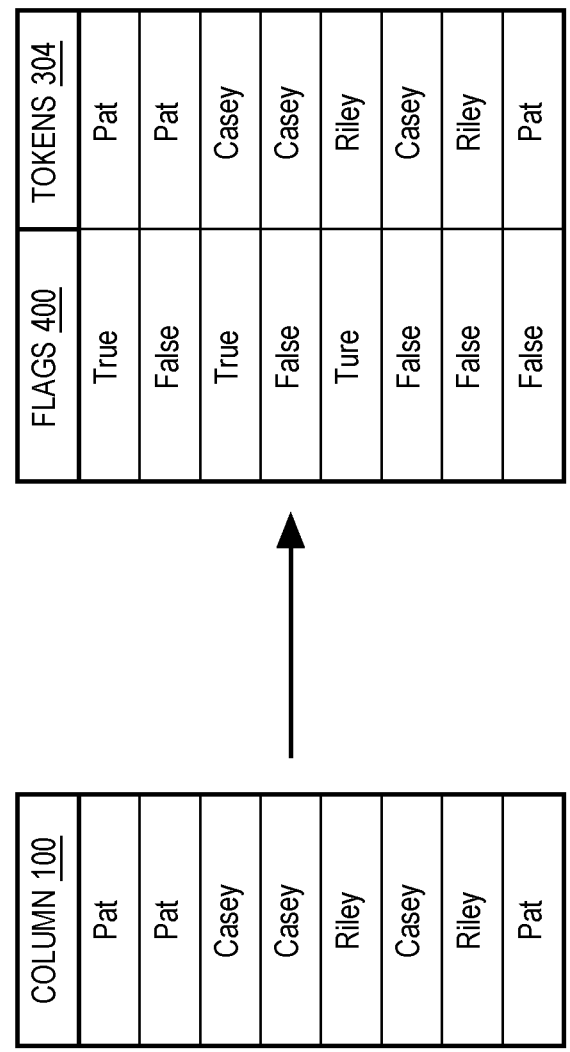
FIG. 4 depicts an example non-blocking operation involved in de-duplication.

Referring to FIG. 4, ENCODE_FLAG_FIRST generates flags 400 indicating whether or not a particular token is the first value of a set of one or more identical values. For example, the "Pat" token in Row 1 is flagged as "True", because it is the first "Pat" to be processed. However, the "Pat" in Row 2 is flagged as "False", because it is not the first "Pat" to be processed. For the purpose of providing a clear example, flags 400 comprise the binary indicators "True" and "False". However, it should be appreciated that flags 400 may be implemented using bit flags or any other set of two or more indicators for distinguishing between distinctness and non-distinctness.

In some embodiments, flags are determined based on references to a hash table. For example, a token may be hashed, and if a hash bucket does not already exist for the token, a hash bucket may be created, and the token may be flagged as a distinct token. This is because a non-existent hash bucket indicates that the token has a different value from any other token that has been processed. However, if a hash bucket already exists for the token, the token may be flagged as a duplicate token. This is because the hash bucket indicates that the token has the same value as another token that has already been processed.

Merging Multiple Operations

As mentioned above, in some embodiments, each of ENCODE_FIRST( ), ENCODE_SPARSE_CODE, and ENCODE_FLAG_FIRST operate with reference to a hash table. However, generating a code dictionary may involve two or more of these operations. Thus, separately invoking two or more of these operations can result in generating multiple hash tables that are the same or similar.

To avoid such an inefficient utilization of computing resources, two or more of these operations can be logically merged into a single operation that refers to a single hash table. For example, ENCODE_FIRST( ) and ENCODE_FLAG_FIRST may be performed concurrently to avoid generating two separate hash tables. As in the case where ENCODE_FIRST( ) is performed separately, a token would be hashed, and if a hash bucket for the token does not exist, a hash bucket is generated for storing the token and its row identifier. However, the token, its row identifier, and a flag indicating distinctness may be provided together as output.

In other words, generating a single hash bucket would not only cause determination of a row identifier, but also cause generation of a flag indicating distinctness. On the other hand, if a hash bucket for the token already exists, the token, the row identifier that is already stored in the hash bucket, and a flag that indicates non-distinctness may be provided together as output.

However, operations that are to be merged should be performed on the same set(s) of tokens. In other words, an operation should have a set of parameters that are identical to those of any other operations with which it is to be merged. Assume for the sake of illustration that two code dictionaries are to be generated based on the following SQL statement:

SELECT encode_first(primary_keys_300) OVER(PARTITION BY column_100), encode_sparse_code OVER(PARTITION BY column 100, another_column), encode_flag_first OVER(PARTITION BY column_100), encode_flag_first OVER(PARTITION BY another_column, column 100)
FROM database_table Notably, the ENCODE_FIRST( ) and the first ENCODE_FLAG_FIRST operations have the same partitioning parameter, so these operations form a first set of operations that can be merged. Similarly, the ENCODE_SPARSE_CODE and the second ENCODE_FLAG_FIRST operations have the same set of partitioning parameters, so these operations form a second set of operations that can be merged.

Figure 5:
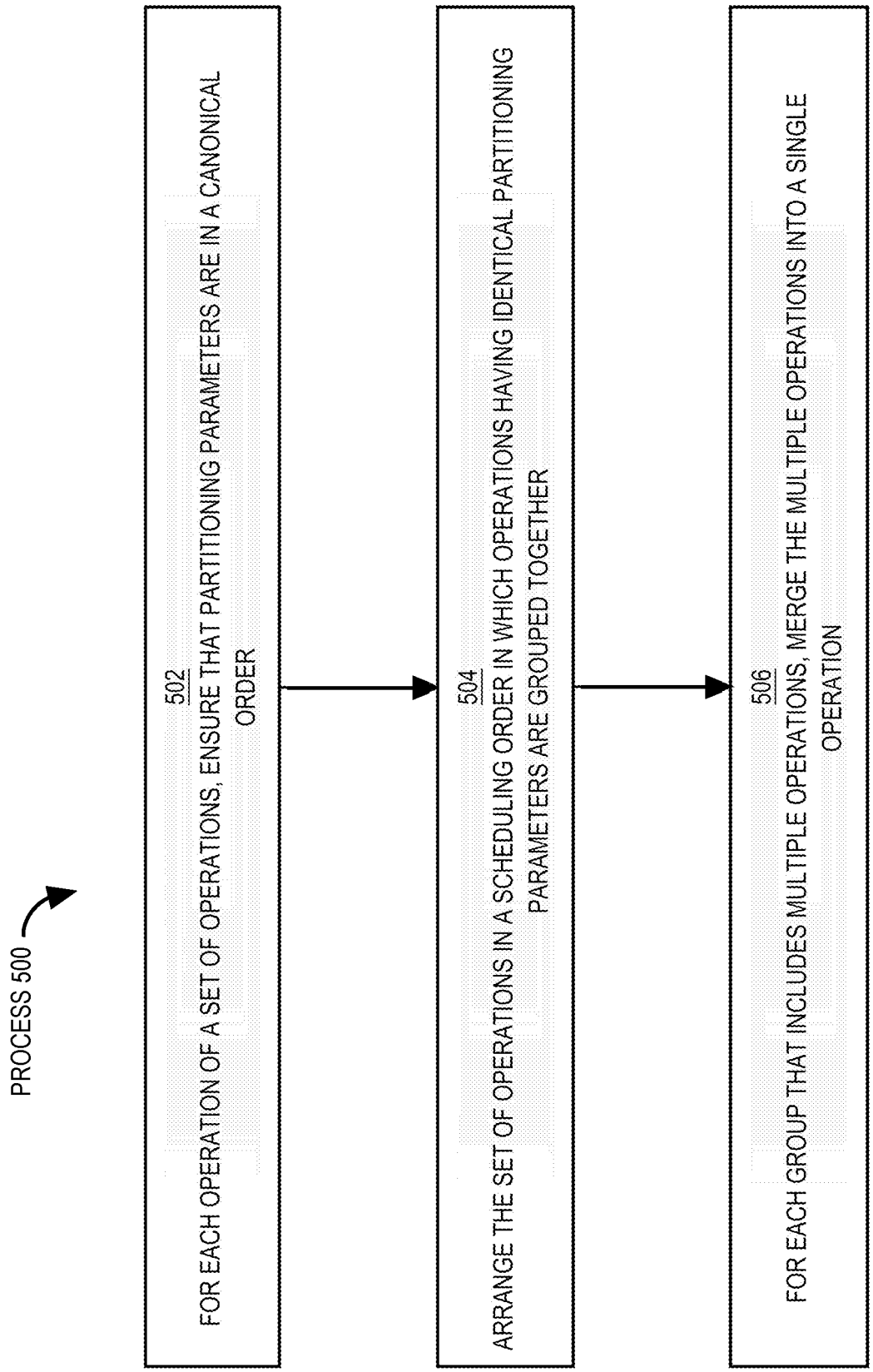
FIG. 5 is a flow diagram that depicts an example approach for merging multiple operations.

FIG. 5 depicts an example process 500 for merging multiple operations. In some embodiments, process 500 is performed as a query rewrite that occurs after a query plan is generated. Thus, process 500 may be performed on the nodes of an operator tree, where each node corresponds to a respective operation.

At block 502, process 500 ensures that partitioning parameters are arranged in a canonical order. This can be performed for each node of the operator tree to facilitate comparing one set of parameters to another set of parameters. Accordingly, the particular order used is not important. For example, the partitioning parameters of the ENCODE_SPARSE_CODE operation may be arranged in lexicographical order to make them identical to the partitioning parameters of the second ENCODE_FLAG_FIRST operation.

At block 504, process 500 groups together operations having identical partitioning parameters. This can be performed by rearranging the nodes of the operator tree such that nodes having identical partitioning parameters are positioned contiguously in the operator tree. For example, the order of the nodes corresponding to the ENCODE_SPARSE_CODE and the first ENCODE_FLAG_FIRST operations may be switched such that the ENCODE_FIRST( ) and the first ENCODE_FLAG_FIRST operations are scheduled to be performed in temporal proximity to each other. This also causes the ENCODE_SPARSE_CODE and the second ENCODE_FLAG_FIRST operations to be scheduled for execution in temporal proximity to each other.

At block 506, process 500 logically merges each group of operations such that each group of operations can be performed concurrently. This can be performed by merging multiple nodes of the operator tree into a single node. For example, the nodes of the ENCODE_FIRST( ) and the first ENCODE_FLAG_FIRST operations may be merged, and the nodes of the ENCODE_SPARSE_CODE and the second ENCODE_FLAG_FIRST operations may be merged.

Notably, each of the ENCODE_FIRST( ), ENCODE_SPARSE_CODE, and ENCODE_FLAG_FIRST operations have the prefix "ENCODE". In some embodiments, this prefix causes the query compiler to treat these operations as user-defined functions. As such, the query compiler generates a query plan in which blocking operations are tentatively scheduled to be executed. However, prior to execution, a query rewrite is performed to replace the blocking operations in the query plan with non-blocking operations.

Advantageously, naming non-blocking operations using such prefixes enables non-blocking operations to be introduced into a database system with minimal changes to the existing DBMS infrastructure. In particular, it is unnecessary to make any changes to the lexer or parser. However, some changes to the plan generator may be made.

Code Dictionary Generation

Figure 6:
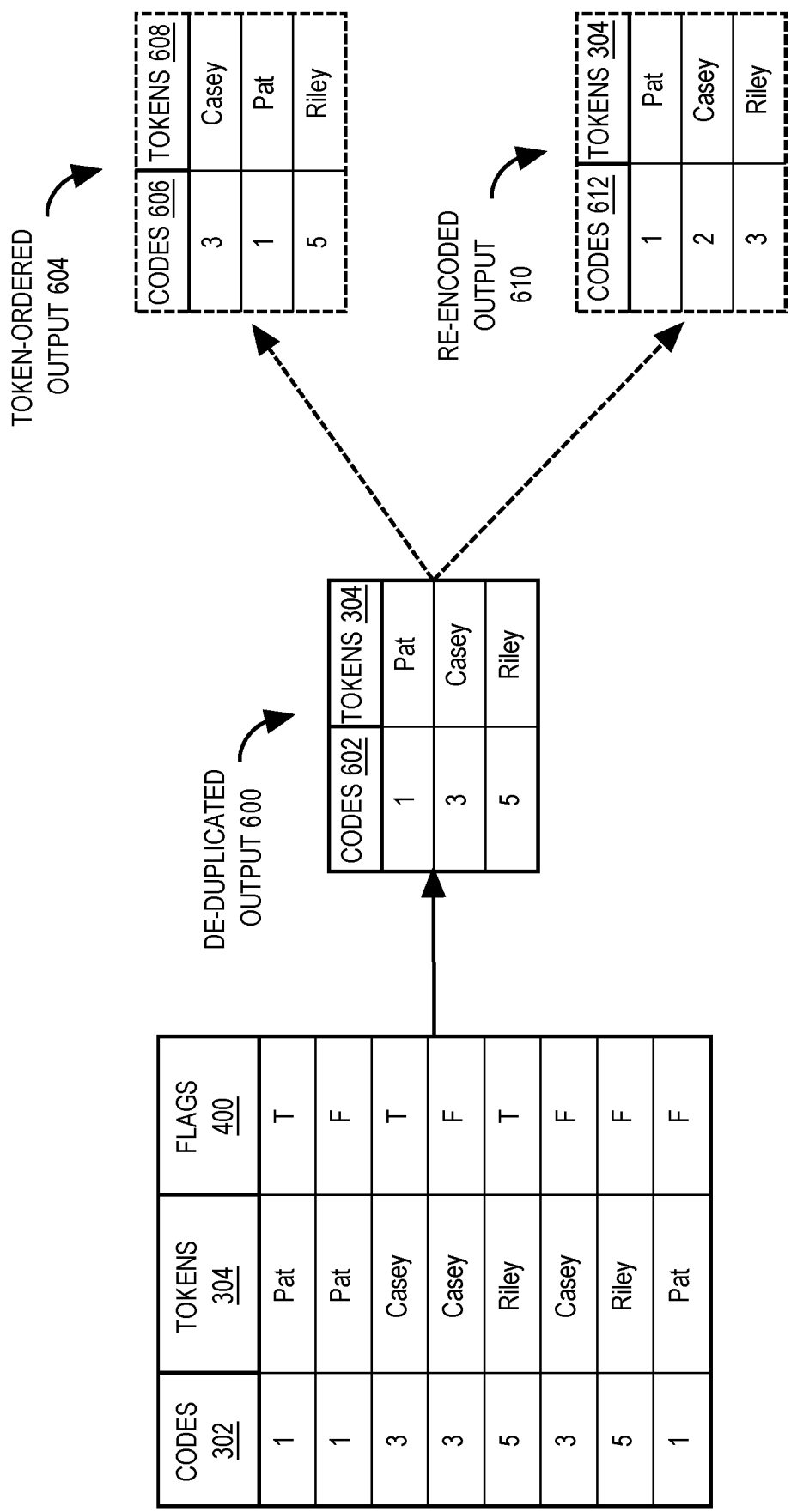
FIG. 6 depicts an example approach for generating a code dictionary based, at least in part, on non-blocking operations.

As mentioned above, the output of non-blocking operations can be stored as a code dictionary upon removing any duplicate correlations between tokens and codes. Referring to FIG. 6, the output of ENCODE_FIRST and ENCODE_FLAG_FIRST comprises codes 302, tokens 304, and flags 400. Notably, there are several duplicate correlations in the output. For example, there are three instances of the token "Pat" being correlated with the code "1".

As also mentioned above, removing duplicate correlations can be efficiently achieved by filtering on flags 400. Referring to FIG. 6, filtering results in de-duplicated output 600, which can be used as a code dictionary. Notably, codes 602 are sparse, not dense. Furthermore, the de-duplicated tokens 304 are not ordered.

However, if a token-ordered code dictionary is desired, a sorting operation may be subsequently performed. Thus, the sorting operation, which is a blocking operation, can be deferred until a token-ordered dictionary is needed, such as when a range query is received. Furthermore, until the token-ordered dictionary is needed, non-blocking operations can be used to reduce the amount of data upon which the deferred sorting operation is to be performed.

Referring to FIG. 6, token-ordered output 604 is optionally generated based on performing a sorting operation on de-duplicated output 600. Notably, tokens 608 are organized in a lexicographical order, thereby enabling token-ordered output 604 to be used as a code dictionary for evaluating range queries.

Additionally or alternatively, if dense codes are desired, a re-encoding operation may be subsequently performed. In the example of FIG. 6, re-encoded output 610 is optionally generated based on correlating tokens 304 with codes 612, which are dense. This may be achieved based on performing a ranking operation on tokens 304. However, in some embodiments, a ranking operation is performed on tokens 608 to generate a token-ordered code dictionary having dense codes, thereby enabling efficient evaluation of range queries over encoded data.

Process Overview

Figure 7:
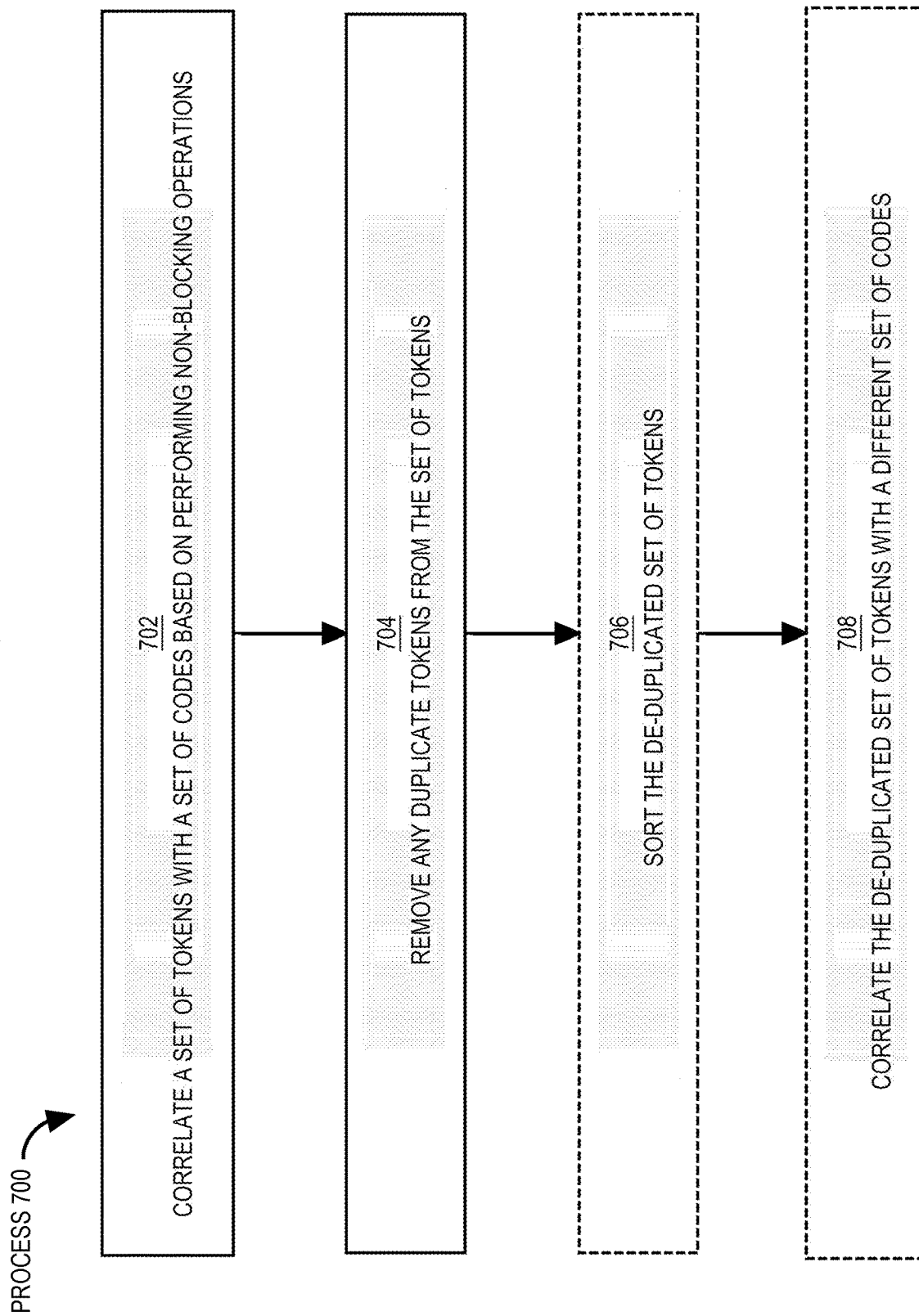
FIG. 7 is a flow diagram that depicts an example approach for generating a code dictionary based on non-blocking operations.

Referring to FIG. 7, process 700 is an example approach for generating a code dictionary. At least part of process 700 may be performed at a plurality of processes/nodes.

At block 702, process 700 correlates a set of tokens with a set of codes. This can be achieved based on performing any number of a variety of non-blocking operations that process the set of tokens in a streaming fashion. In some embodiments, the output comprises a set of sparse codes that are correlated with an unordered set of tokens. Some of the output may be stored as an encoded column of values.

At block 704, process 700 removes any duplicate tokens from the set of tokens. To enable storing some of the output as a code dictionary, duplicate tokens and their corresponding codes may be filtered from the output. This may be achieved based on flags that differentiate between distinct tokens and non-distinct tokens.

At optional block 706, process 700 generates a token-ordered dictionary based on performing a sorting operation on the de-duplicated set of tokens. The sorting operation can be a blocking operation that involves synchronization across a plurality of processes/nodes. Advantageously, the blocking operation can be deferred until after non-blocking operations have been performed, thereby enabling the blocking operation to be performed on a reduced amount of data.

At optional block 708, process 700 correlates the de-duplicated set of tokens with a different set of codes. For example, process 700 may re-encode the de-duplicated set of tokens using dense codes.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
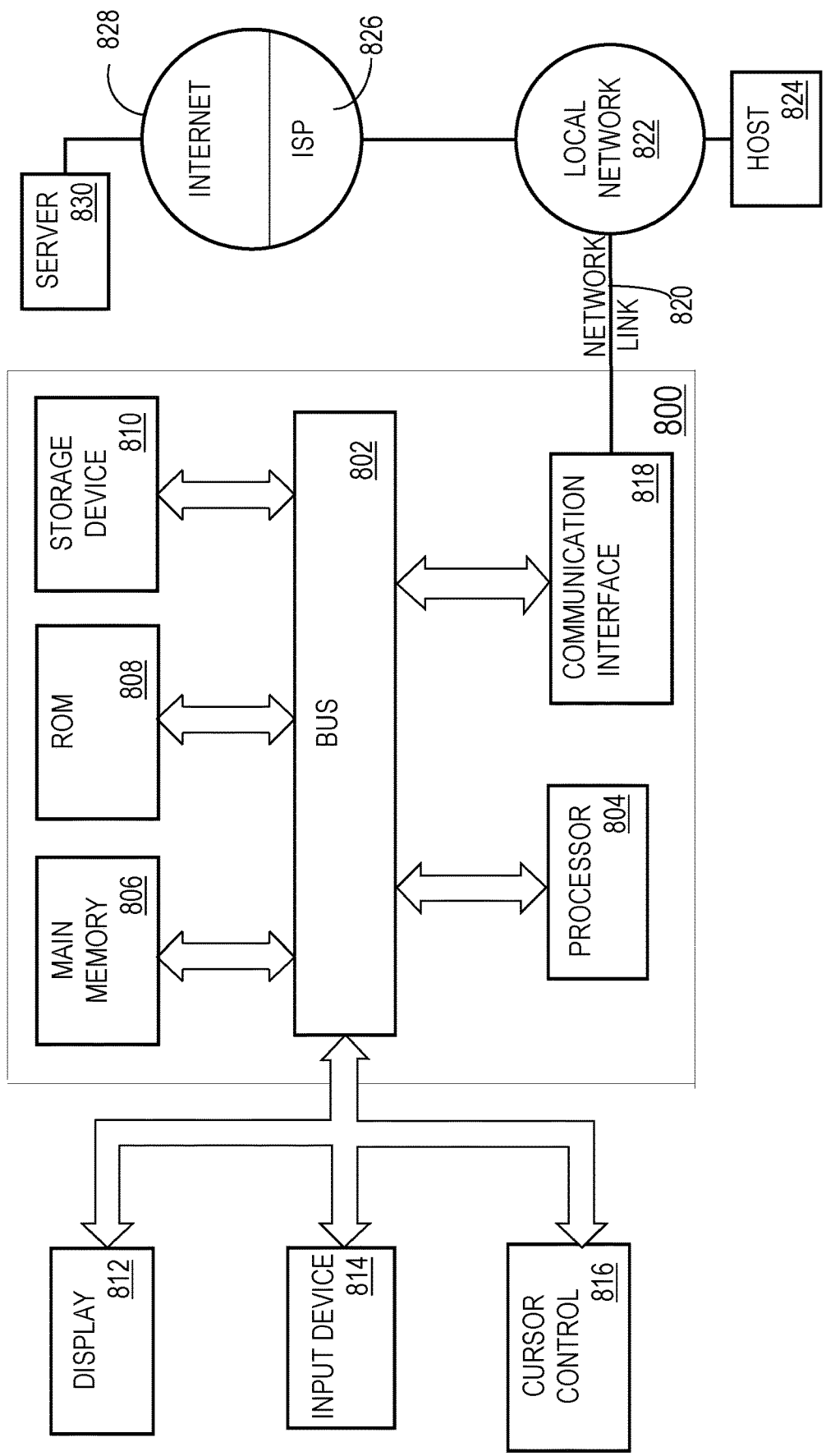
FIG. 8 depicts a computer system upon which embodiments may be implemented.

For example, FIG. 8 is a block diagram that illustrates a computer system 800 upon which an embodiment of the disclosure may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Software Overview

Figure 9:
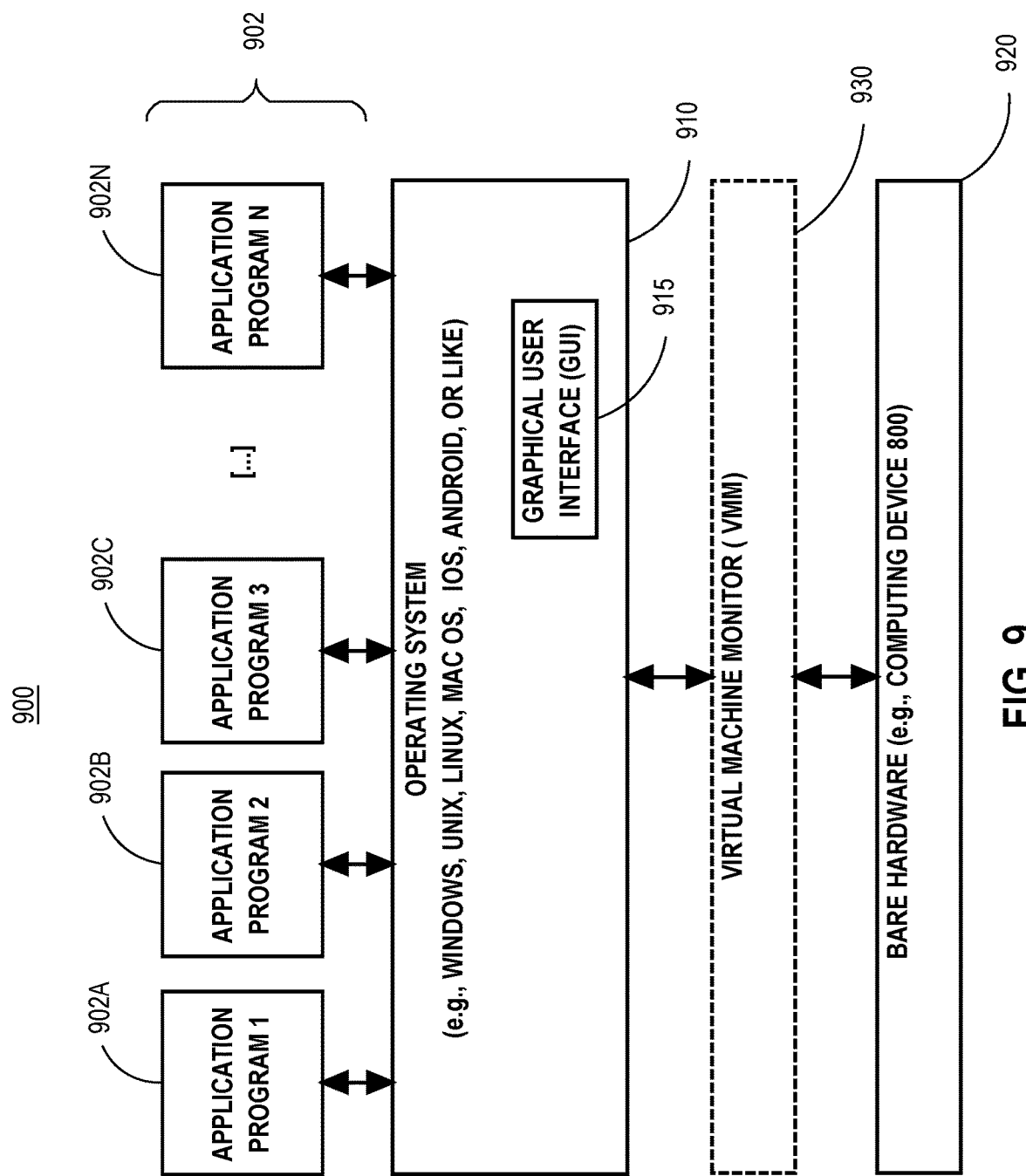
FIG. 9 depicts a software system for controlling the operation of the computer system.

FIG. 9 is a block diagram of a software system 900 that may be employed for controlling the operation of computer system 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computer system 800. Software system 900, which may be stored in system memory (RAM) 806 and on fixed storage (e.g., hard disk or flash memory) 810, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 810 into memory 806) for execution by the system 800. The applications or other software intended for use on system 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of system 900. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the system 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of system 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

Extensions And Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method of generating a code dictionary, the method comprising:
    storing a column of tokens in a table, said column of tokens comprising a first token in a first row of said table and a second token in a second row of said table;
    executing at least one SQL statement to generate data for said code dictionary, wherein executing said at least one SQL statement causes:
        correlating said column of tokens with a set of row identifiers comprising a first row identifier that identifies said first row and a second row identifier that identifies said second row, said first row identifier being different from said second row identifier;
        wherein correlating said column of tokens with said set of row identifiers comprises:
            storing a correlation between said first token and said first row identifier,
            when said first token and said second token have different values, storing a correlation between said second token and said second row identifier, and
            when said first token and said second token are identical, storing a correlation between said second token and said first row identifier;
    after correlating said column of tokens with said set of row identifiers, removing any duplicate correlations; and
    wherein the method is performed by one or more computing devices.

2. The method of claim 1, wherein said set of row identifiers are primary keys of a database table that stores said column of tokens.

3. The method of claim 1, further comprising:
    after removing any duplicate correlations, correlating each distinct token of said column of tokens with a respective code in a set of codes, said set of codes being different from said set of row identifiers.

4. The method of claim 1, further comprising:
    after removing any duplicate correlations, generating a token-ordered code dictionary comprising each distinct token of said column of tokens.

5. The method of claim 4, wherein generating said token-ordered code dictionary is performed by a plurality of parallel processes.

6. The method of claim 5, wherein each parallel process of said plurality of parallel processes is executed at a respective database node of a plurality of database nodes.

7. The method of claim 1, wherein correlating said column of tokens with said set of row identifiers further comprises:
    when said first token and said second token have different values, flagging said second token as a distinct token, and
    when said first token and said second token are identical, flagging said second token as a duplicate token.

8. A method of generating a code dictionary, the method comprising:
    storing a set of tokens comprising a first token and a second token, said first token and said second token being separate elements of said set of tokens;
    correlating said set of tokens with a set of identifiers comprising a first identifier and a second identifier, said first identifier being different from said second identifier, each identifier of said set of identifiers having a first portion and a second portion, said first portion identifying a particular database node of a plurality of database nodes, and said second portion identifying a distinct token processed at said particular database node;
    wherein correlating said set of tokens with said set of identifiers comprises:
        storing a correlation between said first token and said first identifier,
        when said first token and said second token have different values, storing a correlation between said second token and said second identifier, and
        when said first token and said second token are identical, storing a correlation between said second token and said first identifier;
    after correlating said set of tokens with said set of identifiers, removing any duplicate correlations,
    wherein the method is performed by one or more computing devices.

9. The method of claim 8, further comprising:
after removing any duplicate correlations, correlating each distinct token of said set of tokens with a respective code in a set of codes, said set of codes being different from said set of identifiers.

10. The method of claim 8, further comprising:
after removing any duplicate correlations, generating a token-ordered code dictionary comprising each distinct token of said set of tokens.

11. The method of claim 10, wherein generating said token-ordered code dictionary is performed by a plurality of parallel processes.

12. The method of claim 11, wherein each parallel process of said plurality of parallel processes is executed at a respective database node of said plurality of database nodes.

13. The method of claim 8, wherein correlating said set of tokens with said set of identifiers further comprises:
when said first token and said second token have different values, flagging said second token as a distinct token, and
when said first token and said second token are identical, flagging said second token as a duplicate token.

14. One or more non-transitory storage media storing a sequence of instructions which, when executed by one or more computing devices, cause:
storing a column of tokens in a table, said column of tokens comprising a first token in a first row of said table and a second token in a second row of said table;
executing at least one SQL statement to generate data for a code dictionary, wherein executing said at least one SQL statement causes:
correlating said column of tokens with a set of row identifiers comprising a first row identifier that identifies said first row and a second row identifier that identifies said second row, said first row identifier being different from said second row identifier;
wherein correlating said column of tokens with said set of row identifiers comprises:
storing a correlation between said first token and said first row identifier,
when said first token and said second token have different values, storing a correlation between said second token and said second row identifier, and
when said first token and said second token are identical, storing a correlation between said second token and said first row identifier; and
after correlating said column of tokens with said set of row identifiers, removing any duplicate correlations.

15. The one or more non-transitory storage media of claim 14, wherein said set of row identifiers are primary keys of a database table that stores said column of tokens.

16. The one or more non-transitory storage media of claim 14, wherein said sequence of instructions further comprise instructions which, when executed by said one or more computing devices, cause:
after removing any duplicate correlations, correlating each distinct token of said column of tokens with a respective code in a set of codes, said set of codes being different from said set of row identifiers.

17. The one or more non-transitory storage media of claim 14, wherein said sequence of instructions further comprise instructions which, when executed by said one or more computing devices, cause:
after removing any duplicate correlations, generating a token-ordered code dictionary comprising each distinct token of said column of tokens.

18. The one or more non-transitory storage media of claim 17, wherein generating said token-ordered code dictionary is performed by a plurality of parallel processes.

19. The one or more non-transitory storage media of claim 18, wherein each parallel process of said plurality of parallel processes is executed at a respective database node of a plurality of database nodes.

20. The one or more non-transitory storage media of claim 14, wherein correlating said column of tokens with said set of row identifiers further comprises:
when said first token and said second token have different values, flagging said second token as a distinct token, and
when said first token and said second token are identical, flagging said second token as a duplicate token.

21. One or more non-transitory storage media storing a sequence of instructions which, when executed by one or more computing devices, cause:
storing a set of tokens comprising a first token and a second token, said first token and said second token being separate elements of said set of tokens;
correlating said set of tokens with a set of identifiers comprising a first identifier and a second identifier, said first identifier being different from said second identifier, each identifier of said set of identifiers having a first portion and a second portion, said first portion identifying a particular database node of a plurality of database nodes, and said second portion identifying a distinct token processed at said particular database node;
wherein correlating said set of tokens with said set of identifiers comprises:
storing a correlation between said first token and said first identifier,
when said first token and said second token have different values, storing a correlation between said second token and said second identifier, and
when said first token and said second token are identical, storing a correlation between said second token and said first identifier; and
after correlating said set of tokens with said set of identifiers, removing any duplicate correlations.

22. The one or more non-transitory storage media of claim 21, wherein said sequence of instructions further comprise instructions, which when executed by said one or more computing devices, cause:
after removing any duplicate correlations, correlating each distinct token of said set of tokens with a respective code in a set of codes, said set of codes being different from said set of identifiers.

23. The one or more non-transitory storage media of claim 21, wherein said sequence of instructions further comprise instructions, which when executed by said one or more computing devices, cause:
after removing any duplicate correlations, generating a token-ordered code dictionary comprising each distinct token of said set of tokens.

24. The one or more non-transitory storage media of claim 23, wherein generating said token-ordered code dictionary is performed by a plurality of parallel processes.

25. The one or more non-transitory storage media of claim 24, wherein each parallel process of said plurality of parallel processes is executed at a respective database node of said plurality of database nodes.

26. The one or more non-transitory storage media of claim 21, wherein correlating said set of tokens with said set of identifiers further comprises:

when said first token and said second token have different values, flagging said second token as a distinct token, and when said first token and said second token are identical, flagging said second token as a duplicate token.

\* \* \* \* \*